(12) United States Patent
Hottier et al.

(10) Patent No.: US 9,027,245 B2
(45) Date of Patent: May 12, 2015

(54) METHOD FOR PRODUCING A METAL REINFORCEMENT FOR A TURBOMACHINE BLADE

(75) Inventors: Christine Hottier, La Celle Saint Cloud (FR); Bertrand Lamaison, Issy les Moulineaux (FR); Jacques Abousefian, Achères (FR)

(73) Assignee: Snecma, Paris (FR)

( * ) Notice: Subject to any disclaimer, the term of this patent is extended or adjusted under 35 U.S.C. 154(b) by 303 days.

(21) Appl. No.: 13/805,126

(22) PCT Filed: Jun. 23, 2011

(86) PCT No.: PCT/FR2011/051454
§ 371 (c)(1),
(2), (4) Date: Dec. 18, 2012

(87) PCT Pub. No.: WO2011/161385
PCT Pub. Date: Dec. 29, 2011

(65) Prior Publication Data
US 2013/0089428 A1 Apr. 11, 2013

(30) Foreign Application Priority Data
Jun. 24, 2010 (FR) ...................... 10 55066

(51) Int. Cl.
*B21K 1/74* (2006.01)
*B21K 3/04* (2006.01)
(Continued)

(52) U.S. Cl.
CPC . *B21K 3/04* (2013.01); *B23P 15/04* (2013.01); *F01D 5/147* (2013.01); *F01D 5/282* (2013.01); *F01D 5/286* (2013.01); *F04D 29/023* (2013.01); *F04D 29/324* (2013.01); *Y02T 50/672* (2013.01); *Y02T 50/673* (2013.01);
(Continued)

(58) Field of Classification Search
CPC ................ B21J 1/00; B21J 1/02; B21J 1/04; B21J 5/022; B21J 5/02; B21J 9/00; B21K 3/00; B21K 1/06; B21K 1/74; B23P 15/06; B23P 15/04
USPC ................... 29/889.1, 889.23, 889.7, 889.71, 29/889.72
See application file for complete search history.

(56) References Cited

U.S. PATENT DOCUMENTS

| 2,941,603 A | 6/1960 | Jovanovich |
| 7,770,427 B2 * | 8/2010 | Nakahara et al. ............... 72/358 |
| 2009/0165299 A1 | 7/2009 | Cammer |

FOREIGN PATENT DOCUMENTS

| DE | 198 03 589 A1 | 8/1999 |
| EP | 1 574 270 A1 | 9/2005 |

(Continued)

OTHER PUBLICATIONS

International Search Report as issued for PCT/FR2011/051454.

*Primary Examiner* — Alexander P Taousakis
*Assistant Examiner* — Lee A Holly
(74) *Attorney, Agent, or Firm* — Pillsbury, Winthrop, Shaw Pittman LLP (57) ABSTRACT

A method for producing a solid component which in succession includes deforming a metal bar by forging using two dies in order to obtain an intermediate component including two fins one on each side of a solid part capable of forming the base of the metal reinforcement, the two fins being at a divergent angle α; deforming the two fins of the intermediate component, altering the divergent angle α, so as to obtain the final shape of the turbomachine blade leading edge or trailing edge metal reinforcement.

13 Claims, 5 Drawing Sheets

(51) Int. Cl.
  *B23P 15/04*  (2006.01)
  *F01D 5/14*  (2006.01)
  *F01D 5/28*  (2006.01)
  *F04D 29/02*  (2006.01)
  *F04D 29/32*  (2006.01)
  *F01D 5/00*  (2006.01)
  *B29C 65/00*  (2006.01)
  *B29L 31/08*  (2006.01)
  *B29C 65/48*  (2006.01)

(52) U.S. Cl.
  CPC .... *B29C 66/12461* (2013.01); *B29C 66/12463* (2013.01); *B29C 66/301* (2013.01); *B29C 66/53* (2013.01); *B29C 66/721* (2013.01); *B29C 66/742* (2013.01); *B29L 2031/08* (2013.01); *B29L 2031/082* (2013.01); *F01D 5/00* (2013.01); *F05D 2230/25* (2013.01); *F05D 2230/24* (2013.01); *B29C 65/484* (2013.01); *B29C 65/48* (2013.01); *B29C 65/483* (2013.01)

(56) References Cited

FOREIGN PATENT DOCUMENTS

| EP | 1 908 919 A1 | 4/2008 |
| EP | 1 719 699 B1 | 6/2010 |
| WO | WO 94/23890 | 10/1994 |

\* cited by examiner

METHOD FOR PRODUCING A METAL REINFORCEMENT FOR A TURBOMACHINE BLADE

CROSS REFERENCE TO RELATED APPLICATIONS

This application is the U.S. National Stage of PCT/FR2011/051454, filed Jun. 23, 2011, which in turn claims priority to French Patent Application No. 1055066, filed Jun. 24, 2010, the contents of all applications are incorporated herein by reference in their entireties.

The present invention relates to a method for producing a metal reinforcement for a composite or metal turbomachine blade.

The invention relates more particularly to a method for producing a metal reinforcement for the leading edge of a turbomachine blade.

The field of the invention is that of turbomachines and more particularly that of fan blades made of composite material or metal material of a turbomachine, the leading edge thereof comprising a metal structural reinforcement.

However, the invention may also be applied to the production of a metal reinforcement designed to reinforce a leading edge or a trailing edge of a blade of any type of turbomachine, whether terrestrial or aeronautical, and in particular a helicopter turbojet engine or an aircraft turbojet engine.

The invention may also be applied to the production of any solid components of complex geometric shape.

It will be remembered that the leading edge corresponds to the front part of an aerodynamic profile which faces the airflow and which divides the flow of air into a flow of air on the pressure surface and a flow of air on the suction surface. The trailing edge corresponds to the rear part of an aerodynamic profile where the flow on the pressure surface and the flow on the suction surface are combined.

Turbomachine blades and, in particular, fan blades, are subjected to significant mechanical stresses, in particular associated with the rotational speed, and have to meet strict conditions of weight and load. One possible option to lighten the blades is the use of composite materials for the manufacture thereof.

It is known to provide the fan blades of a turbomachine, produced from composite materials, with a metal structural reinforcement extending over the entire height of the blade and beyond the leading edge thereof as mentioned in the document EP 1908919 filed by SNECMA. Such a reinforcement makes it possible to protect the composite blade assembly in the event of an impact by a foreign body on the fan, such as for example a bird, hail or even stones.

In particular, the metal structural reinforcement protects the leading edge of the composite blade by avoiding risks of delamination, fibre rupture or even damage by fibre/matrix decohesion.

Conventionally, a turbomachine blade comprises an aerodynamic surface extending in a first direction between a leading edge and a trailing edge and, in a second direction substantially perpendicular to the first direction, between a root and a tip of the blade. The metal structural reinforcement follows the shape of the leading edge of the aerodynamic surface of the blade and extends in a first direction beyond the leading edge of the aerodynamic surface of the blade to follow the profile of the pressure surface and the suction surface of the blade and in the second direction between the root and the tip of the blade.

In the known manner, the metal structural reinforcement is a metal component made of titanium, produced entirely by milling from a solid block of material.

However, the metal reinforcement of a blade leading edge is a component which is complicated to produce, requiring numerous reworking operations and complex tools involving significant production costs.

Within this context, the invention aims to remedy the aforementioned problems, by proposing a method for producing a metal reinforcement for the leading edge or trailing edge of a turbomachine blade, making it possible to reduce significantly the production costs of such a component and to simplify the manufacturing process.

To this end, the invention proposes a method for producing a metal reinforcement for the leading edge or trailing edge of a turbomachine blade comprising:

a step of deforming a metal bar by forging through two dies in order to obtain an intermediate component comprising two fins, one on each side of a solid part capable of forming the base of said metal reinforcement, said two fins forming an opening angle $\alpha$;

a step of deforming said fins of said intermediate component altering said opening angle $\alpha$, so as to obtain the final shape of the metal reinforcement on the leading edge or trailing edge of the turbomachine.

By the term "step of deforming by forging" is understood an operation of shaping metals by forging consisting of pushing a ductile material (made ductile by heating) through a hole or a die. Thus, during the first step of deforming the metal bar by forging, the heated solid metal is placed in a tool so that, as a result of thrust, material is forced through an orifice or a die arranged in the tool by plastic flow.

The step of deforming by forging is similar to a step of deforming by direct or reverse extrusion which consists in placing the heated solid metal at the extrusion temperature of the material, i.e. in an environment at a temperature at least equal to 250 degrees Celsius, in a tool and to force it through an orifice, generally a die, by exerting thrust. With a certain degree of force, a plastic flow of metal is produced through the die.

The method of deforming by forging according to the invention is thus different from a stamping method which consists in deforming material to fill a cavity. Moreover, stamping is a method of deforming which consists in displacing metal material perpendicular to the direction of impact of the tool.

By means of the invention, the metal structural reinforcement of complex shape is produced in a simple and rapid manner from a simple metal bar and a series of simple forging steps, thus making it possible to reduce substantially the costs of producing such a component, in particular by using simple tools and machines.

Moreover, the production of a metal structural reinforcement of a turbomachine blade from a metal bar and not from metal sheets also makes it possible to minimize wastage of material and, as a result, the manufacturing costs of such a reinforcement.

Said method for producing thus makes it possible to overcome the complex production of the reinforcement by milling of flat bars which requires large volumes of material and, as a result, makes it possible to reduce the quantities of primary material used.

The method for producing a metal reinforcement of a turbomachine blade according to the invention may also have one or more of the follow features, considered individually or in any combination which is technically possible:

previous said step of deforming said metal bar by forging, the method for producing comprises a step of bending said metal bar in a direction perpendicular to the longitudinal axis of said bar;

previous to said step of deforming said metal bar by forging, the method for producing comprises a step of filling said metal bar in a tool having a cavity corresponding to the final shape of the solid base of said metal reinforcement;

said step of filling said metal bar and said step of deforming said metal bar by forging are carried out in the same tool by means of a plurality of punches;

said step of filling said metal bar is carried out hot;

said step of filling said metal bar, and said step of deforming said metal bar by forging are carried out continuously without cooling the tool;

said step of bending said metal bar, said step of deforming said metal bar by forging and said step of deforming said intermediate component are carried out hot;

said step of bending said metal bar comprises:
- a first sub-step of bending said metal bar in a first direction perpendicular to the longitudinal axis of said bar;
- a second sub-step of bending said metal bar in a second direction perpendicular to said first direction and perpendicular to the longitudinal axis of said bar;

said method comprises a step of producing a preformed portion on said metal bar so as to facilitate the positioning of the tool on said bar during said step of deforming by forging;

said step of deforming by forging is a reverse extrusion step;

said step of deforming by forging is carried out by means of at least one punch in two successive operations;

said step of deforming said fins from said intermediate component simultaneously implements the definitive twisting of said intermediate component said step of deforming said fins from said intermediate component simultaneously implements:
- the finalisation of the shape of the internal radius of the metal reinforcement;
- the formation of the lateral flanks and of the metal reinforcement;
- the finalisation of the twisting of said metal reinforcement.

The present invention also relates to an intermediate component obtained by the method for producing according to the invention.

The present invention also relates to a metal component characterised in that it comprises two fins, one on each side of a solid part capable of forming the base of a metal reinforcement for the leading edge or trailing edge of a turbomachine blade.

Further features and advantages of the invention will be revealed more clearly from the following description which is provided by way of indication and is not in any way limiting, with reference to the accompanying figures, in which:

In all the figures, common elements bear the same reference numerals unless specified to the contrary.

Figure 1:
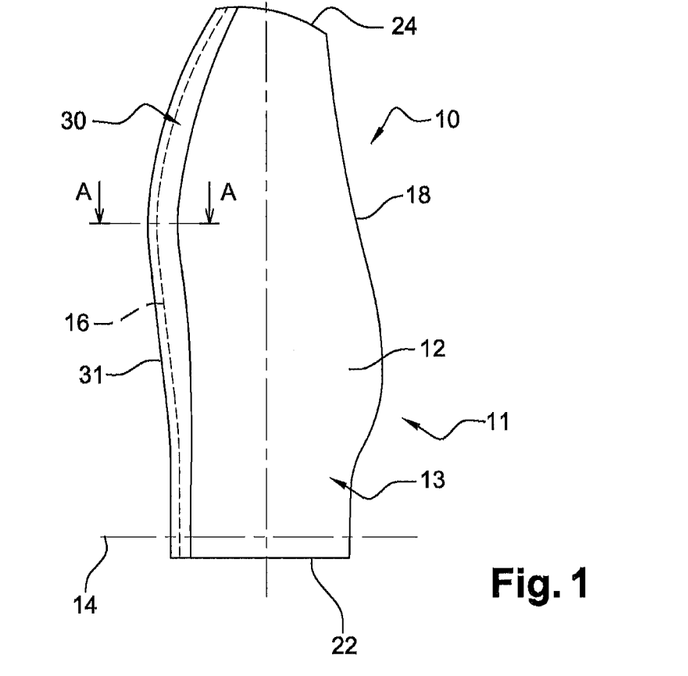
FIG. 1 is a side view of a blade comprising a metal reinforcement for a leading edge obtained by means of the method for producing according to the invention.

FIG. 1 is a side view of a blade comprising a metal structural reinforcement of a leading edge obtained by means of the method for producing according to the invention.

The blade 10 illustrated is, for example, a mobile fan blade of a turbomachine (not shown).

The blade 10 comprises an aerodynamic surface 12 extending in a first axial direction 14 between a leading edge 16 and a trailing edge 18 and in a second radial direction 20 substantially perpendicular to the first direction 14 between a root 22 and a tip 24.

The aerodynamic surface 12 forms the suction surface 13 and the pressure surface 11 of the blade 10, only the suction surface 13 of the blade 10 being shown in FIG. 1. The pressure surface 11 and the suction surface 13 form the lateral faces of the blade 10 which connect the leading edge 16 to the trailing edge 18 of the blade 10.

In this embodiment, the blade 10 is a composite blade typically obtained by stretch-forming a woven composite material. By way of example, the composite material used may be composed of an assembly of woven carbon fibres and a resin matrix, the assembly being shaped by moulding, by means of vacuum-assisted resin transfer moulding.

The blade 10 comprises a metal structural reinforcement 30 adhesively bonded in the region of its leading edge 16 and which extends both in the first direction 14 beyond the leading edge 16 of the aerodynamic surface 12 of the blade 10 and in the second direction 20 between the root 22 and the tip 24 of the blade.

Figure 2:
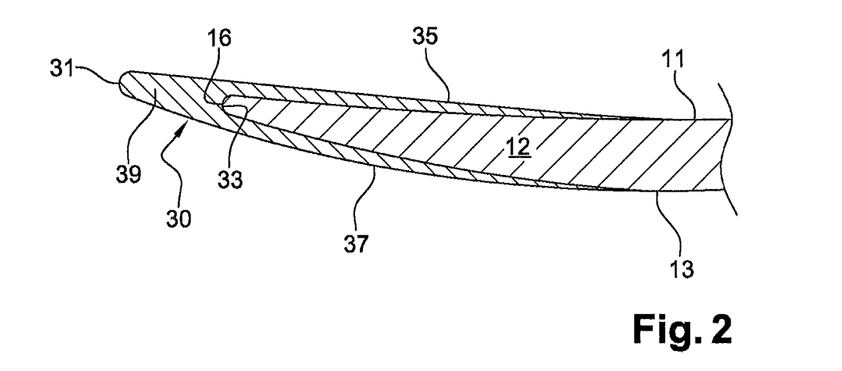
FIG. 2 is a partial sectional view of FIG. 1 along a sectional plane AA.

As shown in FIG. 2, the structural reinforcement 30 follows the shape of the leading edge 16 of the aerodynamic surface 12 of the blade 10 which it extends to form a leading edge 31, known as the leading edge of the reinforcement.

Conventionally, the structural reinforcement 30 is a one-piece component comprising a substantially V-shaped section having a base 39 forming the leading edge 31 and extended by two lateral flanks 35 and 37 respectively following the pressure surface 11 and suction surface 13 of the aerodynamic surface 12 of the blade. The flanks 35, 37 have a profile which is tapered or of reduced thickness in the direction of the trailing edge of the blade.

The base 39 comprises a rounded internal profile 33 capable of following the rounded shape of the leading edge 16 of the blade 10.

The structural reinforcement 30 is metal and preferably based on titanium. More specifically, said material has a high capacity for absorbing energy due to impacts. The reinforcement is adhesively bonded to the blade 10 by means of adhesive known to the person skilled in the art, such as for example a cyanoacrylic adhesive or even epoxy adhesive.

This type of metal structural reinforcement 30 used for the reinforcement of the composite turbomachine blade is described, more particularly, in the patent application EP1908919.

The method according to the invention makes it possible to produce, in particular, a structural reinforcement as illustrated in FIG. 2, FIG. 2 illustrating the reinforcement 30 in its final state mounted on a mobile turbomachine fan blade 10.

Figure 3:
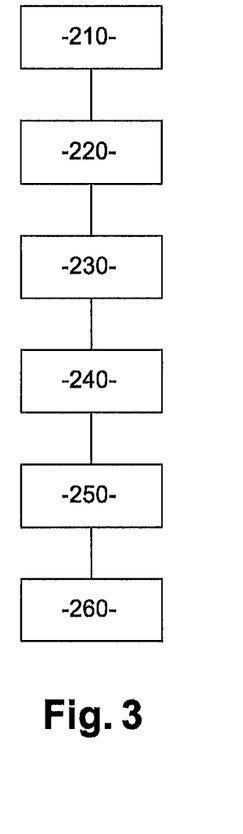
FIG. 3 is a flow chart showing the principal steps of producing a metal reinforcement for a leading edge of a turbomachine blade of the method for producing according to the invention.

FIG. 3 shows a flow chart illustrating the principal steps of a method for producing 200 according to the invention for producing a metal structural reinforcement 30 for the leading edge of a blade 10 as illustrated in FIGS. 1 and 2.

Figures 4A, 4B, 4C, 4D:
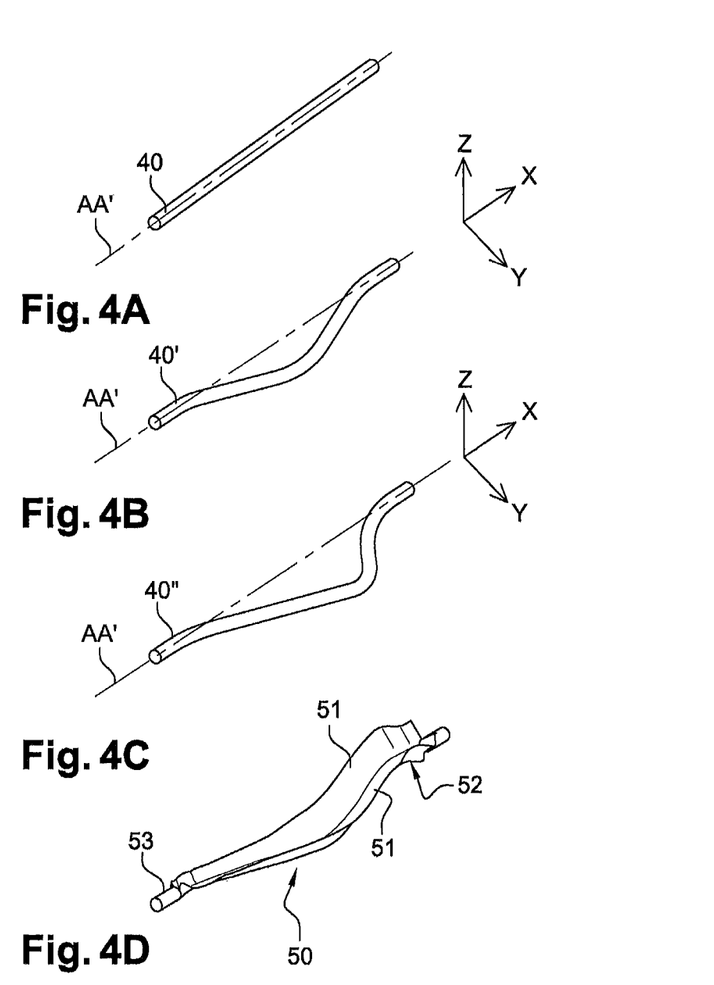
FIGS. 4A, 4B, 4C, 4D, 4E illustrate the structural progression of the metal reinforcement during the different steps of the method for producing illustrated in FIG. 3.

The first step 210 of the method for producing 200 is a step of forging a rectilinear metal bar 40 (illustrated in FIG. 4A) making it possible to bend said bar 40 in a direction perpendicular to the longitudinal axis AA' of the bar 40, as illustrated in FIG. 4B.

The metal bar 40 is a titanium bar of circular section having a diameter in the order of a few millimeters; the diameter of the section varies according to the requirements of the user and the thickness of material required for producing the final component.

During this first step of forging, the metal bar 40 is deformed so as to produce a first bend in a first direction Z by means of a press, for example an isothermal press brought to a temperature of between 700° C. and 940° C. to achieve excellent deformation properties of the titanium with a slow strain rate.

The second step 220 of the method for producing 200 is a step of forging the bent metal bar 40' obtained during the previous step (illustrated in FIG. 4B) so as to bend said bar 40 a second time in a direction which is perpendicular to the longitudinal axis AA' and the axis Z. Thus, according to the reference system illustrated in FIG. 4B, the second bend of the bar 40 is produced in the Y-direction so as to obtain a metal bar 40" with a double bend (i.e. in two directions) as illustrated in FIG. 4C.

This step may also be carried out, for example, by means of an isothermal press brought to a temperature of between 700° C. and 940° C. to achieve good deformation properties of the titanium at a slow strain rate. By way of example, the first and second steps may be implemented by means of a screw press and a punch/matrix tool.

Said two first steps 210, 220 make it possible to twist the substantially rectilinear metal bar 40 along the neutral fibre of the final metal reinforcement 30 as illustrated in FIGS. 1 and 2.

Figure 5A:
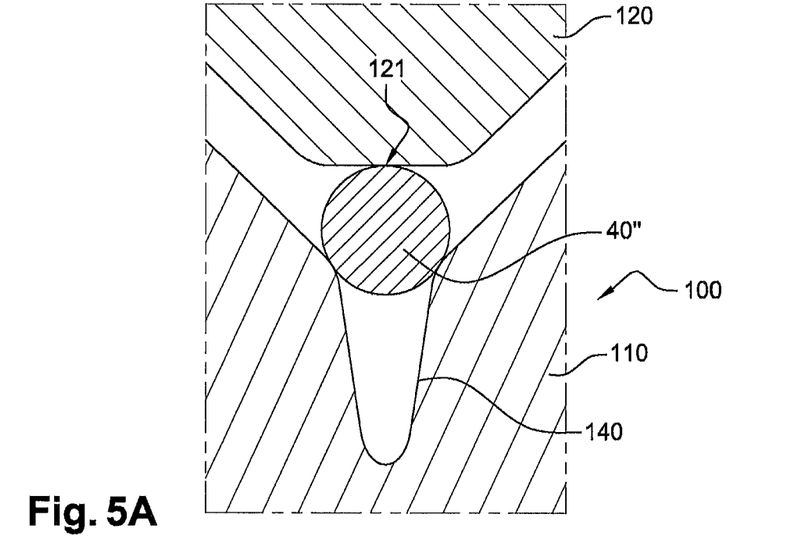
FIGS. 5A, 5B are partial sectional views of the metal reinforcement for the leading edge of a turbomachine blade during the third step of the method illustrated in FIG. 3.
Figure 5B:
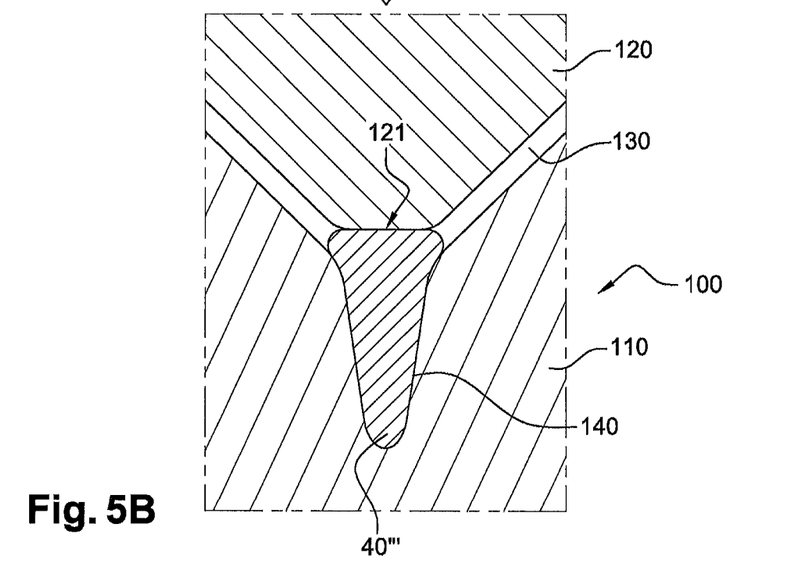

The third step 230 of the method for producing 200 is a step of forging the metal bar 40" with a double bend by an operation of filling the metal bar 40" into a tool 100 in a press as illustrated in FIGS. 5A and 5B.

This step 230 is implemented by prior positioning of the twisted metal bar 40" in the tool 100, as illustrated in FIG. 5A. The metal bar 40" is then deformed by filling under the action of a mobile punch 120 so as to fill the cavity 140 of a matrix 110, as illustrated in FIG. 5B. Then a component 40''' is obtained of which the shape corresponds to the shape of the cavity 140 of the matrix 110. The punch 120 has a substantially planar contact surface 121 capable of coming into contact with the metal bar 40" inserted in the tool and capable of deforming said metal bar so as to insert it into the cavity 140 under the pressure exerted by the punch 120.

The cavity 140 of the tool 100 has the final double bend of the leading edge 31 of the metal reinforcement of the turbomachine blade and corresponds to the final shape of the base 39 of the metal reinforcement 30.

This third step 230 is carried out in a press, typically by means of a screw press, at a temperature in the order of 940° C. At this temperature, the titanium has an elongation rate greater than 35% which makes it possible to produce significant deformation without damaging the properties of the titanium.

The fourth step 240 of the method for producing 200 is a step of forging said metal bar 40''', which has been obtained after packing, by an operation of deforming the metal bar using dies, such as an operation of forging by extrusion.

Extrusion is a method of shaping metals by forging. It consists in pushing a ductile material (made ductile by heating) through a hole or a die. The extrusion process consists in placing solid metal heated to a temperature, known as the extrusion temperature, in a tool and forcing it through an orifice, generally a die, by exerting thrust. With a certain degree of force, a plastic flow is produced through the die.

Two variants of extrusion exist: direct extrusion and reverse extrusion.

Direct extrusion consists in displacing the heated material, which has been previously placed in the tool, by means of a punch towards the die. Reverse extrusion consists in simultaneously displacing the tool and the metal towards the die which makes it possible to overcome friction between the material and the tool.

Advantageously, the step 240 is a reverse extrusion step making it possible to push the material upwards through dies. However, the step 240 may also be a direct extrusion step.

Figure 9:
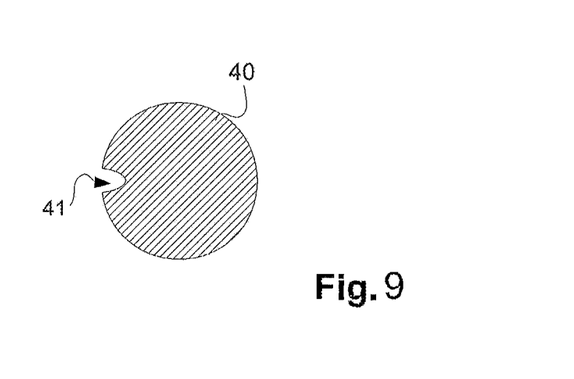
FIG. 9 shows a performed portion made on a metal bar to facilitate the extrusion step according to an embodiment of the invention.

In the case of direct extrusion, and prior to this step 240, it is possible to produce a preformed portion 41 on the metal bar 40 by machining as illustrated in FIG. 9, so as to facilitate the extrusion step, in particular by improving the guidance of the tool.

Figure 6:
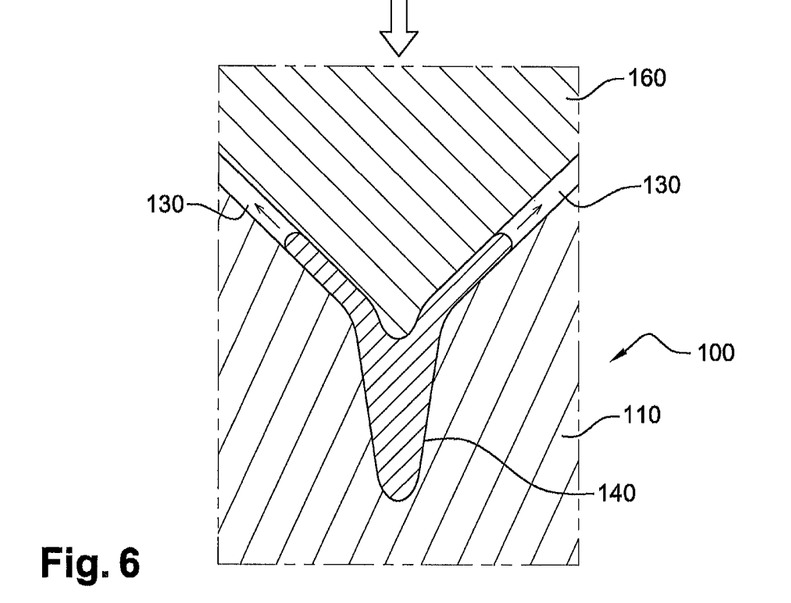
FIG. 6 and FIG. 7 are partial sectional views of the metal reinforcement for the leading edge of the turbomachine blade during the fourth step of the method illustrated in FIG. 3.

Preferably, this step of producing a preformed portion 41 on the metal bar 40 is implemented prior to the steps of bending 210 and 220 of the method according to the invention. This step of forging by reverse extrusion is carried out in the same tool 100 as that used during the previous step. However, the punch 120 which has a planar contact surface 121 is replaced by a punch 160, the contact surface thereof having a shape which is more tapered and substantially V-shaped, as illustrated in FIG. 6.

The specific shape of the punch 160 makes it possible to exert a thrust on the material of the metal bar 40''' to deform it and push it into dies 130 located between the punch 160 and the matrix 110.

Figure 7:
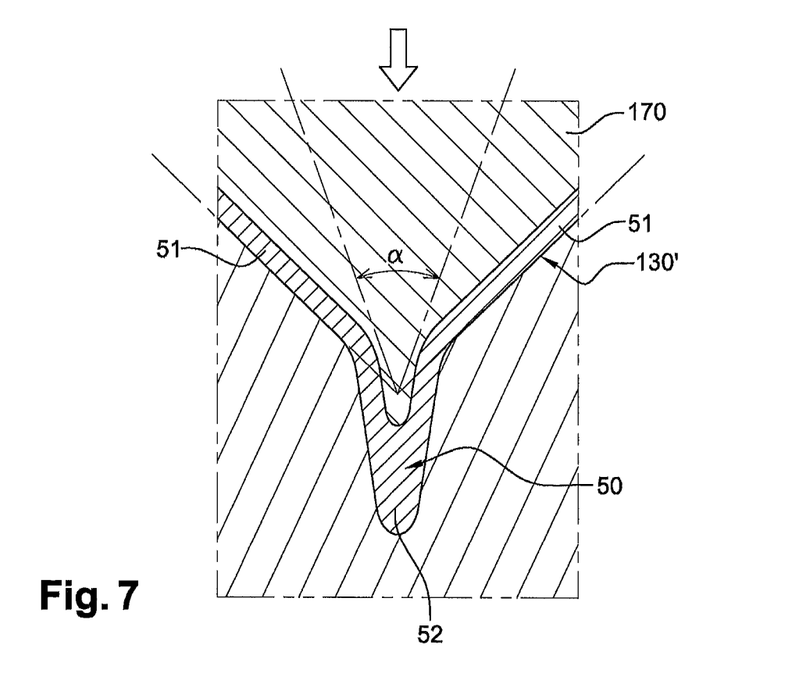

This step 240 of reverse extrusion may be carried out twice with two different successive punches: a first punch 160 as described above and illustrated in FIG. 6 and a second punch 170 illustrated in FIG. 7, which comprises a contact surface which is more pointed and more tapered than the previous punch 160 so as to push more material into the dies 130' between the punch 170 and the matrix 110.

Typically, the shape of the punch 170 corresponds to the final shape of the internal profile 33 of the base 39 of the metal reinforcement 30 (illustrated in FIG. 2) i.e. the rounded shape of the leading edge 16 of the blade 10.

This reverse extrusion step 240 may be carried out in one or more operations using different punches. The choice of the number of operations depends on the quantity of material to be extruded in addition to the complexity of the component to be produced.

Advantageously, the different operations of the step 240 are successively carried out without excessive intervention by the operator and without a significant variation in the temperature (i.e. without cooling the component and the tool).

Similar to the preceding step, the step 240 of reverse extrusion is carried out at a temperature in the order of 940° C. (plus or minus 10° C.) by means of a press of the hydraulic press, screw press type, etc.

The reverse extrusion step thus makes it possible by means of a limited number of operations to obtain significant deformations of the material so as to shape an intermediate component 50 illustrated in FIG. 4D.

The intermediate component 50 is a substantially V-shaped component or Y-shaped component (Y-shape shown in FIGS. 4E and 7) comprising two lateral fins 51, one on each side of a solid part 52 substantially corresponding to the final shape of the base 39 of the metal reinforcement 30, in particular the leading edge 31.

At the ends of the intermediate component 50, journals 53 produced from the initial metal bar 20 make it possible to handle the component during the different steps and operations as required and also permit a reference component to be produced in the different tools used.

The intermediate component 50 is produced in the tool 100 such that the two lateral fins 51 have a divergent angle $\alpha$ of substantially between 60° and 90°, to fulfil the requirements of the metallurgical specification.

The thicknesses of the lateral fins 51 correspond substantially to the thicknesses of the flanks on the pressure surface and the suction surface of the metal reinforcement 30, the fins 51 thus have a profile progressively reducing in thickness in the direction opposing the leading edge of the intermediate component 50. To this end, the dies 130 of the tool 100 are dimensioned so as to obtain the profile and the thicknesses of the fins required for producing the metal reinforcement 30.

The fifth step 250 of the method for producing 200 is a step of forging, altering the opening angle $\alpha$ of the lateral fins 51. During this step 250, the two lateral fins 51 of the intermediate component 50 are brought closer together, i.e. the angle $\alpha$ is reduced so as to obtain the final shape of the metal reinforcement 30 of the leading edge of the turbomachine blade.

This step 250 is implemented in a forming tool 300 (illustrated in FIG. 8) having the final and definitive shape of the metal reinforcement 30 and by means of a conventional press of the hydraulic press, screw press type, etc. To this end, the tool 300 comprises a cavity 310 substantially corresponding to the profile of the turbomachine blade for which the metal reinforcement 30 is intended, in addition to a counterpart (not shown) having the external shape of the metal reinforcement 30 and, in particular, the profile of the lateral flanks 35 and 37 respectively following the pressure surface 11 and suction surface 13 of the aerodynamic surface 12 of the blade 10.

Figure 8:
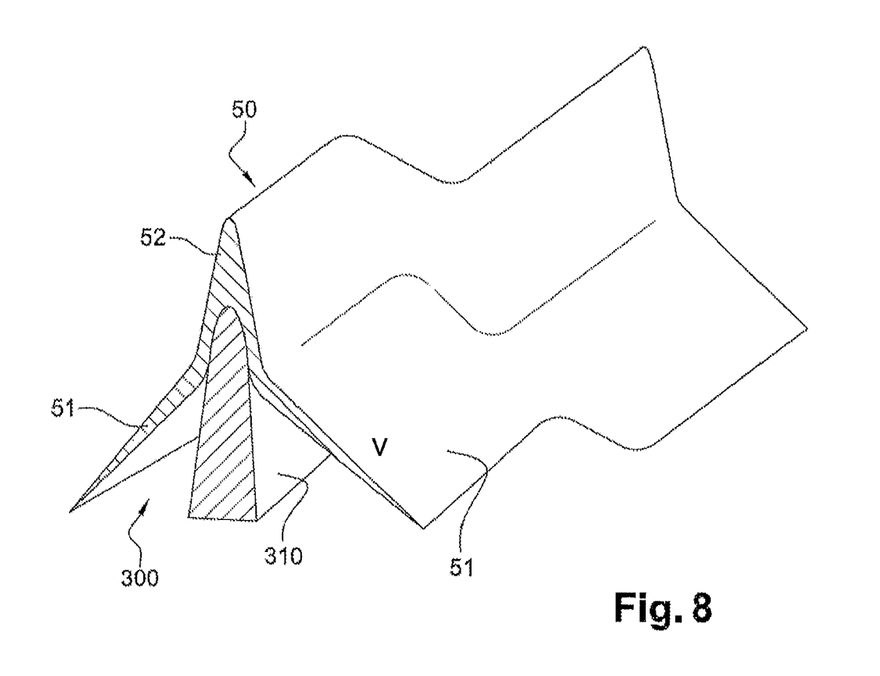
FIG. 8 is a partial perspective view of the metal reinforcement for the leading edge of the turbomachine blade during the fifth step of the method illustrated in FIG. 3.

According to the embodiment shown by way of example in FIG. 8, the intermediate component 50 is positioned in the tool 300 so as to bear against the cavity 310.

The two fins 51 are then folded back in the direction of the cavity 210 by the counterpart in order to reduce the angle $\alpha$ and to shape the final profile of the metal reinforcement 30.

Advantageously, the intermediate component 50 is simultaneously twisted with the deformation of the fins 51 by means of the tool 300 so as to finalise the twisting of the component.

This step 250 thus simultaneously makes it possible to:
  finalise the shape of the internal radius 33 of the metal reinforcement 30;
  shape the lateral flanks 35 and 37 of the metal reinforcement 30;
  finalise the twisting of the metal reinforcement 30.
However, according to a further embodiment, said different operations may be implemented separately if required.

Similar to the previous steps 230, 240, the step 250 is carried out at a temperature in the order of 940° C.

The metal reinforcement 30 thus obtained during the step 250 is preferably demoulded whilst hot in order to facilitate the demoulding of the component. However, the demoulding may also be carried out cold.

So as to facilitate the demoulding of the metal reinforcement 30, in particular when cold, the cavity 310 may consist of a plurality of mobile or removable sections which are capable of being individually dismantled.

In order to facilitate the demoulding, it is also possible initially to prepare the tool 300 by depositing a protective layer on the cavity 310 so as to prevent the reinforcement from 30 adhering to the tool 300. By way of example, said protective layer may be a layer of aluminum oxide.

Finally, the sixth step 260 of the method for producing 200 is an optional step of finishing and reworking the reinforcement 30 by machining. Said step of finishing 260 consists, in particular, in:
  reworking the flanks 35, 37 (this step consists, in particular, in trimming the flanks 35, 37 and reducing the thickness of the flanks 35, 37 on the pressure surface and suction surface);
  polishing the reinforcement 30 in order to obtain the required surface state.

Figure 4E:
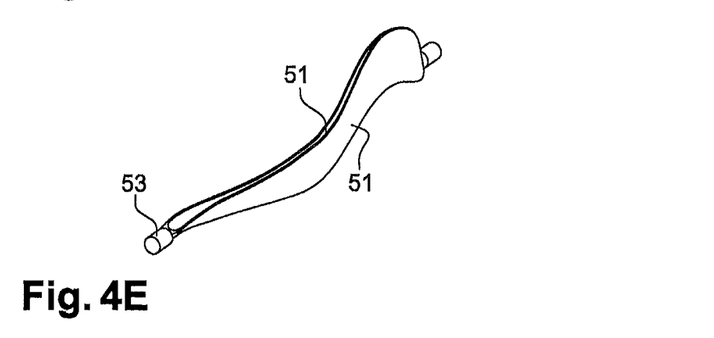

FIG. 4E illustrates the reinforcement 30 in its final state obtained by the method for producing according to the invention.

In association with said principal production steps, the method according to the invention may also comprise steps of inspecting the reinforcement 30 in a non-destructive manner, making it possible to ensure the geometric and metallurgical conformity of the assembly obtained. By way of example, non-destructive inspecting may be implemented by a method of inspecting using optical rays (by white light) or non-contacting ultrasound.

The method according to the invention has mainly been described for a metal reinforcement from a metal bar based on titanium; however, the method according to the invention is also applicable to nickel-based materials or even steel-based materials The method according to the invention has mainly been described for the production of a metal reinforcement from a metal bar based on titanium; however, the invention is also applicable to the use of a metal bar previously reinforced, for example, with SiC—Ti.

An embodiment of a titanium-reinforced metal bar would, for example, be a metal bar comprising a core reinforced with SiC—Ti and a titanium covering. Said reinforced metal bar may be obtained, for example, by a co-extrusion method consisting in passing a bar made of SiC—Ti, enclosed by a titanium sleeve, inside a die (i.e. a reduction cone). The compressive forces and heat generated by friction between the two materials at their interface provide a close bond between the two materials.

The core made of SiC—Ti may be advantageously positioned in the metal bar so as to follow, or not follow, the deformation of the metal bar during the method according to the invention.

The method according to the invention may also comprise a prior step of machining the reinforced metal bar obtained, before the implementation of the steps of forging, for example, by mechanical or chemical machining.

Naturally, it is also envisaged to produce a reinforced metal bar comprising a non-reinforced core and a reinforced covering.

Advantageously, the different bending, packing, extrusion and twisting operations are carried out on a component forming a metal reinforcement brought to a temperature in the order of 940° C., plus or minus ten percent, the environment and the tool being able to adopt different temperatures which have been mentioned in the example described above.

The invention has been described, in particular, for the production of a metal reinforcement for a composite turbomachine blade; however, the invention is also applicable to the production of a metal reinforcement for a metal turbomachine blade.

The invention has been described, in particular, for producing a metal reinforcement of a leading edge for a turbomachine blade; however, the invention is also applicable to the production of a metal reinforcement of a trailing edge for a turbomachine blade.

The further advantages of the invention are, in particular, as follows:
reduction of production costs;
reduction of production time;
simplification of the manufacturing process;
reduction of tool costs;
reduction of material costs.

The invention claimed is:

1. A method for producing a metal reinforcement for a leading edge or a trailing edge of a turbomachine blade comprising:
   a step of deforming a metal bar by forging through two dies in order to obtain an intermediate component comprising two fins, one on each side of a solid part capable of forming a base of said metal reinforcement, said two fins forming an opening angle α;
   deforming said two fins of said intermediate component altering said opening angle α, so as to obtain a final shape of the metal reinforcement on leading edge or trailing edge of the turbomachine blade.

2. The method according to claim claim 1, wherein, prior to deforming said metal bar by forging, the method comprises bending said metal bar in a direction perpendicular to a longitudinal axis of said bar.

3. The method according to claim 1, wherein, prior to deforming said metal bar by forging, the method comprises filling said metal bar in a tool having a cavity corresponding to the final shape of the base of said metal reinforcement.

4. The method for producing according to claim 3, wherein filling said metal bar and deforming said metal bar by forging are carried out in the same tool using a plurality of punches.

5. The method according to claim 3, wherein filling said metal bar is carried out hot.

6. The method according to claim 3, wherein filling said metal bar, and deforming said metal bar by forging are carried out continuously without cooling the tool.

7. The method according to claim 2, wherein bending said metal bar, deforming said metal bar by forging and deforming said intermediate component are carried out hot.

8. The method according to claim 2, wherein bending said metal bar comprises:
   a first bending said metal bar in a first direction perpendicular to the longitudinal axis of said bar;
   a second bending said metal bar in a second direction perpendicular to said first direction and perpendicular to the longitudinal axis of said bar.

9. The method according to claim 1, comprising producing a preformed portion on said metal bar so as to facilitate a positioning of a tool on said bar during said deforming by forging.

10. The method according to claim 1, wherein deforming by forging is a reverse extrusion step.

11. The method according to claim 1, wherein deforming by forging is carried out using at least one punch in two successive operations.

12. The method according to claim 1, wherein deforming said two fins from said intermediate component simultaneously implements a definitive twisting of said intermediate component.

13. The method according to claim 1, wherein deforming said two fins from said intermediate component simultaneously implements:
   a finalisation of the shape of an internal radius of the metal reinforcement;
   a formation of lateral flanks and of the metal reinforcement;
   a finalisation of a twisting of said metal reinforcement.

* * * * *